(12) United States Patent
Chitre et al.

(10) Patent No.: US 12,554,509 B2
(45) Date of Patent: Feb. 17, 2026

(54) SYSTEMS AND METHODS FOR AUTOMATED OPERATING SYSTEM MIGRATION

(71) Applicant: Esper.io, Inc., Bellevue, WA (US)

(72) Inventors: Varun Chitre, Bellevue, WA (US); Yadhu Gopalan, Bellevue, WA (US)

(73) Assignee: Esper.io, Bellevue, WA (US)

( * ) Notice: Subject to any disclaimer, the term of this patent is extended or adjusted under 35 U.S.C. 154(b) by 143 days.

(21) Appl. No.: 18/232,988

(22) Filed: Aug. 11, 2023

(65) Prior Publication Data

US 2024/0053992 A1 Feb. 15, 2024

Related U.S. Application Data

(60) Provisional application No. 63/397,083, filed on Aug. 11, 2022.

(51) Int. Cl.
*G06F 9/4401* (2018.01)
(52) U.S. Cl.
CPC .................................. *G06F 9/4416* (2013.01)
(58) Field of Classification Search
CPC ......... G06F 9/4416; G06F 8/61; G06F 9/4406
See application file for complete search history.

(56) References Cited

U.S. PATENT DOCUMENTS

| | | | |
|---|---|---|---|
| 6,247,109 B1 | 6/2001 | Kleinsorge et al. | |
| 6,260,068 B1 | 7/2001 | Zalewski et al. | |
| 6,321,358 B1 * | 11/2001 | Anderson | G06F 11/10 714/763 |
| 6,430,653 B1 * | 8/2002 | Fujikawa | G06F 3/0676 711/213 |
| 8,176,311 B1 * | 5/2012 | Srinivasan | G06F 9/4401 713/1 |
| 8,555,017 B2 | 10/2013 | McCann | |
| 9,032,139 B2 * | 5/2015 | Siddiqi | G06F 12/0871 711/103 |
| 9,063,838 B1 * | 6/2015 | Boyle | G06F 12/02 |
| 9,804,855 B1 * | 10/2017 | Paningipalli | G06F 9/4406 |
| 10,338,840 B1 * | 7/2019 | Brown | G06F 3/0634 |
| 11,146,459 B2 | 10/2021 | Lehman et al. | |
| 11,340,879 B2 | 5/2022 | Bjordal et al. | |

(Continued)

*Primary Examiner* — Faisal M Zaman
(74) *Attorney, Agent, or Firm* — Constellation Law Group, PLLC; Dale C. Barr (57) ABSTRACT

Systems and methods for automated migration of operating systems on computing devices are disclosed. For example, a system may include a processor, and a storage operatively coupled to the processor. The storage stores instructions that perform operations that may include reducing a size of the first operating system to require less space on a first storage portion storing the first operating system, repartitioning the storage to form a second storage portion sized to receive a second operating system, installing a bootloader operable to load either the first operating system or the second operating system, installing the second operating system into the second storage portion, rebooting the system using the bootloader, receiving an input indicative of a selection of either the first operating system or the second operating system, and booting one of the first operating system or the second operating system in accordance with the input.

20 Claims, 4 Drawing Sheets

(56) References Cited

U.S. PATENT DOCUMENTS

| | | | |
|---|---|---|---|
| 2006/0242397 A1* | 10/2006 | Chen | G06F 3/0644 |
| | | | 713/1 |
| 2007/0002612 A1* | 1/2007 | Chang | G06F 3/0679 |
| | | | 365/185.01 |
| 2007/0067679 A1* | 3/2007 | Deobald | G06F 9/4406 |
| | | | 714/36 |
| 2007/0113226 A1* | 5/2007 | Baron | G06F 9/44505 |
| | | | 717/176 |
| 2007/0214350 A1* | 9/2007 | Isaacson | G06F 9/441 |
| | | | 713/2 |
| 2008/0235482 A1 | 9/2008 | Armstrong et al. | |
| 2009/0007147 A1 | 1/2009 | Craft et al. | |
| 2009/0113423 A1* | 4/2009 | Hiltgen | G06F 9/45558 |
| | | | 718/1 |
| 2009/0271173 A1* | 10/2009 | Vnukov | G06F 9/441 |
| | | | 703/27 |
| 2010/0287207 A1* | 11/2010 | Motoyama | G06F 16/29 |
| | | | 707/804 |
| 2010/0287560 A1 | 11/2010 | Neft | |
| 2011/0125977 A1* | 5/2011 | Karr | G06F 3/0673 |
| | | | 711/201 |
| 2011/0246714 A1 | 10/2011 | Zhou et al. | |
| 2012/0023507 A1* | 1/2012 | Travis | G06F 9/45537 |
| | | | 718/1 |
| 2012/0158804 A1* | 6/2012 | Lim | G06F 3/0661 |
| | | | 707/823 |
| 2012/0191960 A1* | 7/2012 | Piwonka | G06F 9/441 |
| | | | 713/2 |
| 2013/0247222 A1* | 9/2013 | Maksim | G06F 21/31 |
| | | | 726/28 |
| 2013/0268800 A1 | 10/2013 | Rangaiah | |
| 2013/0326189 A1* | 12/2013 | Cilibrasi | G06F 3/0644 |
| | | | 711/208 |
| 2014/0181849 A1* | 6/2014 | Casey | H04N 21/442 |
| | | | 725/14 |
| 2014/0208091 A1* | 7/2014 | Koning | G06F 8/65 |
| | | | 713/2 |
| 2014/0279911 A1* | 9/2014 | Ignomirello | G06F 11/1435 |
| | | | 707/823 |
| 2014/0298000 A1* | 10/2014 | Gillespie | G06F 3/0673 |
| | | | 713/2 |
| 2015/0277986 A1* | 10/2015 | Zhang | G06F 9/441 |
| | | | 713/2 |
| 2015/0332050 A1* | 11/2015 | Garcés-Erice | G06F 9/441 |
| | | | 713/2 |
| 2016/0239321 A1* | 8/2016 | Dong | G06F 9/45545 |
| 2016/0267275 A1* | 9/2016 | Gschwind | G06F 21/34 |
| 2017/0024261 A1 | 1/2017 | Atluri et al. | |
| 2017/0237560 A1* | 8/2017 | Mueller | H04L 63/0428 |
| | | | 713/168 |
| 2018/0025160 A1* | 1/2018 | Hwang | G06F 8/71 |
| | | | 726/25 |
| 2018/0165480 A1* | 6/2018 | Raju | H04L 61/103 |
| 2019/0042583 A1* | 2/2019 | Tierney | G06F 16/10 |
| 2020/0125282 A1* | 4/2020 | Fisher | G06F 3/0664 |
| 2021/0389958 A1* | 12/2021 | Choi | G06F 9/4416 |
| 2022/0004246 A1* | 1/2022 | Xiang | G06F 1/3293 |
| 2022/0214945 A1* | 7/2022 | Chen | G06F 11/1417 |
| 2022/0327215 A1* | 10/2022 | Preimesberger | G06F 9/4406 |

* cited by examiner

SYSTEMS AND METHODS FOR AUTOMATED OPERATING SYSTEM MIGRATION

FIELD OF THE DISCLOSURE

The present disclosure relates generally to operating systems for computing devices, and more specifically, to systems and methods for automated migration of operating systems on computing devices.

CROSS REFERENCE TO RELATED APPLICATIONS

This patent application claims priority benefits under 35 USC § 119(e) from the following U.S. provisional patent application: U.S. Provisional Patent Application No. 63/397,083 filed on Aug. 11, 2022, which application is incorporated herein by reference.

BACKGROUND

Many contemporary business enterprises employ mobile computing devices for a wide variety of purposes, including product sales, inventory management, communications, tracking, record keeping, and other suitable purposes. Often the computing devices have varying characteristics and capabilities that may not be compatible with the enterprise's centralized computing system. Prior art solutions involved qualified technical personnel obtaining each device and physically installing and reconfiguring the operating system and other software applications in order to establish the necessary functionalities for compatible operations. Although desirable results have been achieved, there is room for improvement.

SUMMARY

Systems and methods for automated migration of operating systems on computing devices are disclosed herein. It will be appreciated that systems and methods in accordance with the present disclosure may advantageously allow installation of a new operating system (e.g. a customized Android operating system) on a device that is configured with a different operating system (e.g. Microsoft Windows) in an automated, seamless manner while preserving the existing operating system installation. By provisioning the device with a second operating system, the capabilities of the device may be advantageously increased, particularly for situations wherein the second operating system is a more modern operating system (e.g. Android) that is being actively maintained, updated, supported, and enhanced in comparison with the original operating system.

More specifically, in some implementations, a method includes partitioning a storage of a device to form a first storage portion storing the first operating system, and a second storage portion sized to receive a second operating system; installing a bootloader operable to load either the first operating system or the second operating system; installing the second operating system into the second storage portion; rebooting the system using the bootloader; receiving an input indicative of a selection of either the first operating system or the second operating system; and booting one of the first operating system or the second operating system in accordance with the input.

Alternately, in some implementations, a method includes reducing a size of a first operating system to require less space on a storage storing the first operating system; determining that an un-allocated portion of the storage is sufficient to receive a second operating system; installing a bootloader operable to load either the first operating system or the second operating system; installing the second operating system into the un-allocated portion of the storage; rebooting the system using the bootloader; receiving an input indicative of a selection of either the first operating system or the second operating system; and booting one of the first operating system or the second operating system in accordance with the input.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

BRIEF DESCRIPTION OF THE DRAWINGS

Embodiments of methods and systems in accordance with the teachings of the present disclosure are described in detail below with reference to the following drawings.

DETAILED DESCRIPTION

Systems and methods for automated migration of operating systems on computing devices are described herein. Many specific details of certain embodiments are set forth in the following description and in FIGS. 1-4 to provide a thorough understanding of such embodiments. One skilled in the art will understand, however, that the invention may have additional embodiments, or that alternate embodiments may be practiced without several of the details described in the following description.

For some business enterprises, it may be desirable to provide an operating system on a computing device that is different than the computing device's original operating system. As a representative example, there may be significant advantages to running an Android operating system (e.g. Android Open Source Project (AOSP)) on a computing device that is normally equipped with Windows (e.g. Windows x86 PCs, running on Intel processors). Industries such as retail, hospitality, restaurants, and other representative business enterprises may advantageously use such modified devices for numerous purposes, including as point of sale, kiosk, and digital signage devices.

Further expanding upon this example, it will be appreciated that the x86 family of computer processors dates back to the 1970s. Primarily popularized by Intel, these systems use the x86 instruction set, which can loosely be thought of as the "language" x86 processors "speak." Android (and AOSP, by extension) was architected to support ARM architecture processors, which use the ARM instruction set (based on the RISC instruction set)—a different "language." The majority of modern smartphones and most other mobile devices (including Apple's iPhone, iPad, and MacBook laptops) use ARM architecture processors. ARM and x86 processors both offer programming languages that allow a developer to interact directly with a device's CPU, however, ARM and x86 use completely different assembly languages, and thus even fundamental code between the two is mutually unintelligible. While high-level languages were built to address some of these architectural challenges and bridge technical gaps, there remain inherent differences in how x86 and ARM processors behave.

ARM and x86 have many technical differences, but one of the most critical distinctions in the context of Android between the two is that Android explicitly supports almost any ARM processor available because of its massive device ecosystem. While Android remains technically x86 compatible, the market's lack of Android x86 devices means that compatibility goes largely unleveraged.

Building a version of Android that can run on an x86 processor and remain scalable, supportable, and stable is very difficult. Issues with device drivers, peripheral support, and general system behavior quirks can be the difference between a system that is usable for its intended task and one that is not.

In at least some implementations, systems and methods in accordance with the present disclosure may advantageously allow installation of a custom Android operating system on x86 machines running Microsoft Windows. Such systems and methods may advantageously work in a seamless manner to install the Android OS while preserving the existing Windows installation, creating a dual boot configuration without any data loss. In at least some implementations, manual intervention is not required as long as there is a way to remotely deliver the package to the device with an ability to execute it as an administrator, i.e. with elevated privileges. By provisioning the device with a second operating system, the capabilities of the device may be advantageously increased, particularly for situations wherein the second operating system is a more modern operating system (e.g. Android) that is being actively maintained, updated, supported, and enhanced in comparison with the original operating system.

As described more fully below, in some embodiments, a system in accordance with the present disclosure comprises at least one processor, and a storage operatively coupled to the at least one processor. The storage stores a first operating system, and also stores instructions that, when executed by the at least one processor, perform operations. For example, in some embodiments, the operations performed by the at least one processor may include reducing a size of the first operating system to require less space on a first storage portion storing the first operating system, repartitioning the storage to form a second storage portion sized to receive a second operating system, and installing a bootloader operable to load either the first operating system or the second operating system. The operations may also include installing the second operating system into the second storage portion, rebooting the system using the bootloader, receiving an input indicative of a selection of either the first operating system or the second operating system, and booting one of the first operating system or the second operating system in accordance with the input. These and other operational aspects of systems and methods in accordance with the present disclosure are described more fully below.

Figure 1:
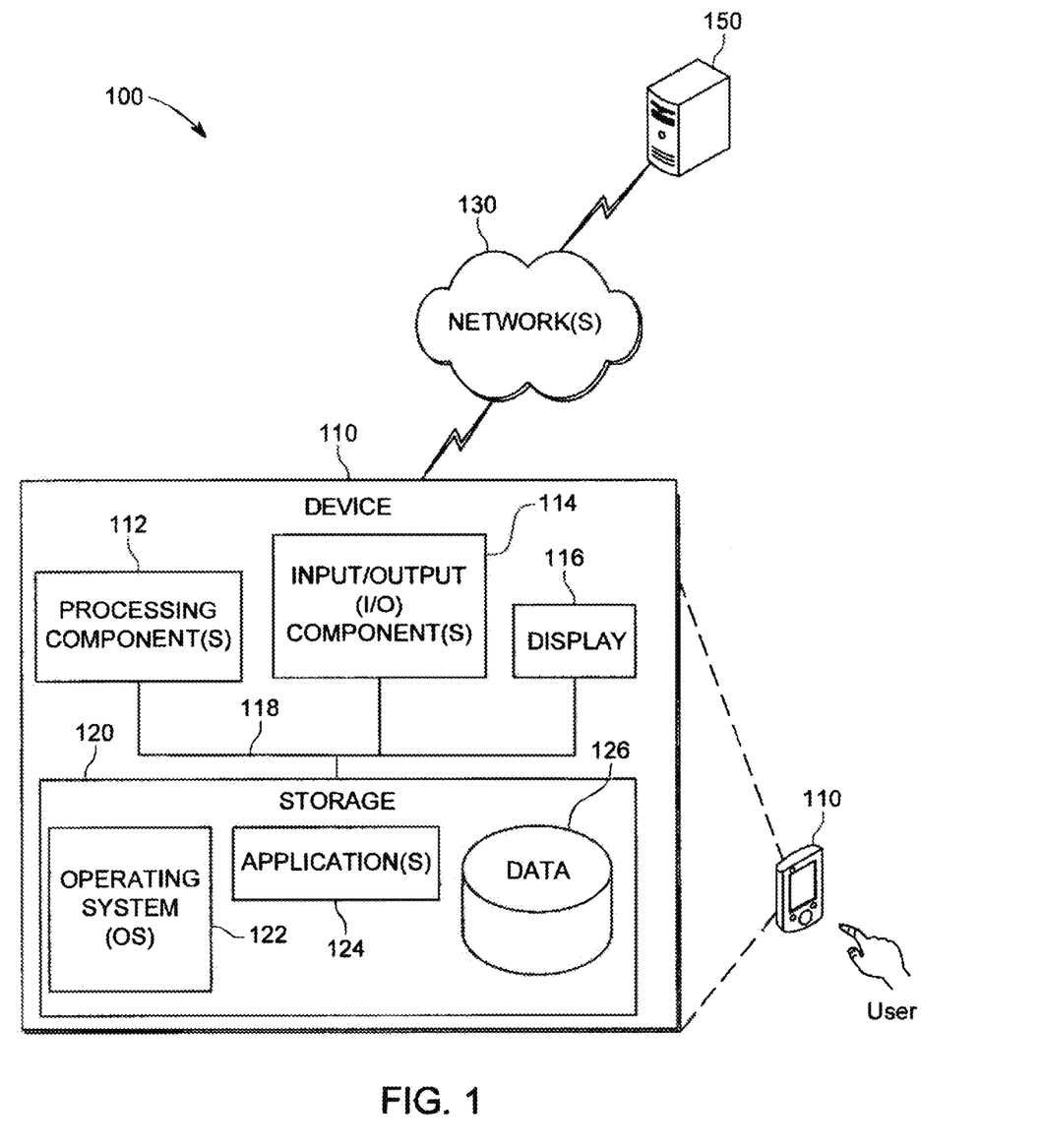
FIG. 1 is an embodiment of a representative environment for implementing techniques and technologies in accordance with the present disclosure.

For example, FIG. 1 is an embodiment of a representative environment 100 for implementing techniques and technologies in accordance with the present disclosure. In this embodiment, the environment includes a device 110 operatively coupled by one or more networks 130 to a provisioning system 150. The one or more networks may include wireless (or wired) networks, and may enable the provisioning system 150 to communicate with the device 110 from any desired location.

In this embodiment, the device 110 includes one or more processing components 112, one or more input/output (I/O) components 114, and a display 116, all of which are operatively coupled to a storage 120 via a bus 118. As further shown in FIG. 1, the storage 120 may store an operating system 122, one or more applications 124, data 126, or any other suitable information or facilities. In at least some implementations, the term "storage" is used to refer to a disk, solid state drive (SSD), or other similar structures or components of the device 110. As noted above, in at least some embodiments, the one or more processing components 112 may include an x86 processor, such as one of several processors commercially-available from Intel (e.g. a dual-core Intel Celeron 3955U processor). In addition, in at least some embodiments, the operating system 122 may be a Windows operating system commercially-available from Microsoft (e.g. a Windows 10).

Figure 2:
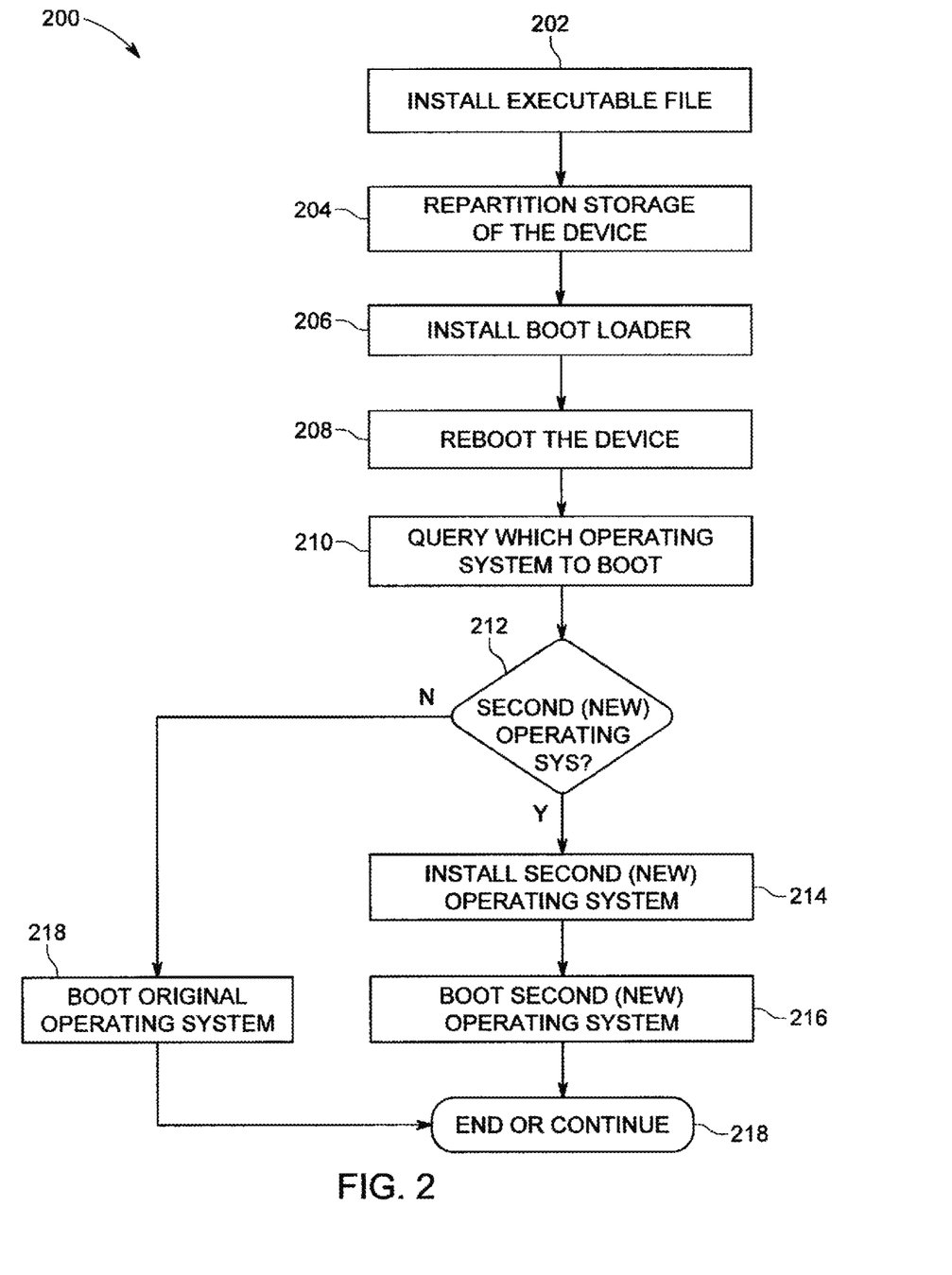
FIG. 2 is an embodiment of a first process for automated migration of an operating system on a computing device in accordance with the present disclosure.

FIG. 2 is an embodiment of a process 200 for automated migration of an operating system on a computing device in accordance with the present disclosure. In this embodiment, the process 200 includes installing an executable file onto the device 110 at 202. For example, in some embodiments, the executable file may be installed by the provisioning system 150 remotely via the one or more networks 130. Alternately, the executable file may be installed directly onto the device 110 by a user (e.g. via a storage device or network connection). In at least some embodiments, the executable file may include suitable programming logic to perform the remaining operations of the process 200 automatically without any additional human intervention.

As further shown in FIG. 2, the process 200 may repartition the storage 120 at 204. In some embodiments, the repartitioning (at 204) may include repartitioning the storage 120 into a first portion for storing the operating system 122 (and the applications 124 and data 126), and a second portion for storing a second operating system. As noted above, in at least some embodiments, the second operating system may be an Android operating system (e.g. AOSP, Android 9, Android 11, etc.). In at least some embodiments, the second operating system may also be customized to operate in accordance with the needs of a particular business enterprise and the characteristics of the device 110.

In the embodiment shown in FIG. 2, the process 200 proceeds to install a bootloader onto the device 110 at 206. The bootloader is configured to ensure that all relevant operating system data is loaded into the storage 120 when the device 110 is started. In at least some embodiments, the bootloader installed on the device 110 (at 206) may be capable of loading either the original operating system 122 (e.g. Windows) or the second operating system (e.g. Android). For example, in a representative embodiment, the bootloader installed on the device 110 (at 206) may be an open-source bootloader known as a GRUB bootloader (GRand Unified Bootloader) that is capable of loading an instruction set suitable for use with an Android operating system. In some embodiments, the process 200 may then reboot the device 110 at 208.

As further shown in FIG. 2, in at least some embodiments, the process 200 includes querying which operating system to boot at 210. For example, the process 200 may query the user to select which operating system to boot via the display 126.

At 212, the process 200 may determine whether the second (or new) operating system has been chosen for booting. In some embodiments, the determination (at 212) may be configured to be totally hands-free, with no user interaction being necessary. If the determination (at 212) is affirmative, then the process 200 installs the second operating system onto the device 110 at 214. More specifically, in at least some embodiments, the second operating system may be installed by the provisioning system 150 remotely via the one or more networks 130.

Following installation of the second operating system (at 214) the process 200 boots the second operating system onto the device 110 at 216. The process 200 then ends or continues to other operations at 220.

Alternately, if it is determined (at 212) that the second operating system is not to be booted, then the process 200 may proceed to booting the original operating system at 218. The process 200 then ends or continues to other operations at 220.

Systems and methods in accordance with the present disclosure may provide substantial advantages over the prior art. For example, such systems and methods may allow installation of Android on top of machines running Windows in a seamless manner, and advantageously allows switching to an entirely new operating system without the need to deploy physical human resources on site to perform the switch. This may provide significant financial savings to enterprises who do not need to deploy engineering and human resources to sites spread across the globe. In addition, the ability to remotely install Android OS on a Windows machine provides a gateway to enterprises to efficiently switch to a modern operating system which has greater support and a significantly better efficiency.

In alternate embodiments, a process in accordance with the present disclosure may shrink (or reduce in size) the Windows partition. Once the shrinking is successful, the Android OS files which are copied to the same partition are made ready. Once the Android OS files are ready, the current boot configuration data (BCD) may be exported to a safe place as a backup in case things go wrong. In some embodiments, the Android OS files may contain a package for GRUB for Windows which the process uses to transfer control to an installer when the system reboots. The process may then add a new BCD entry to load the GRUB for Windows on the next boot, and reboots the machine.

Figure 3:
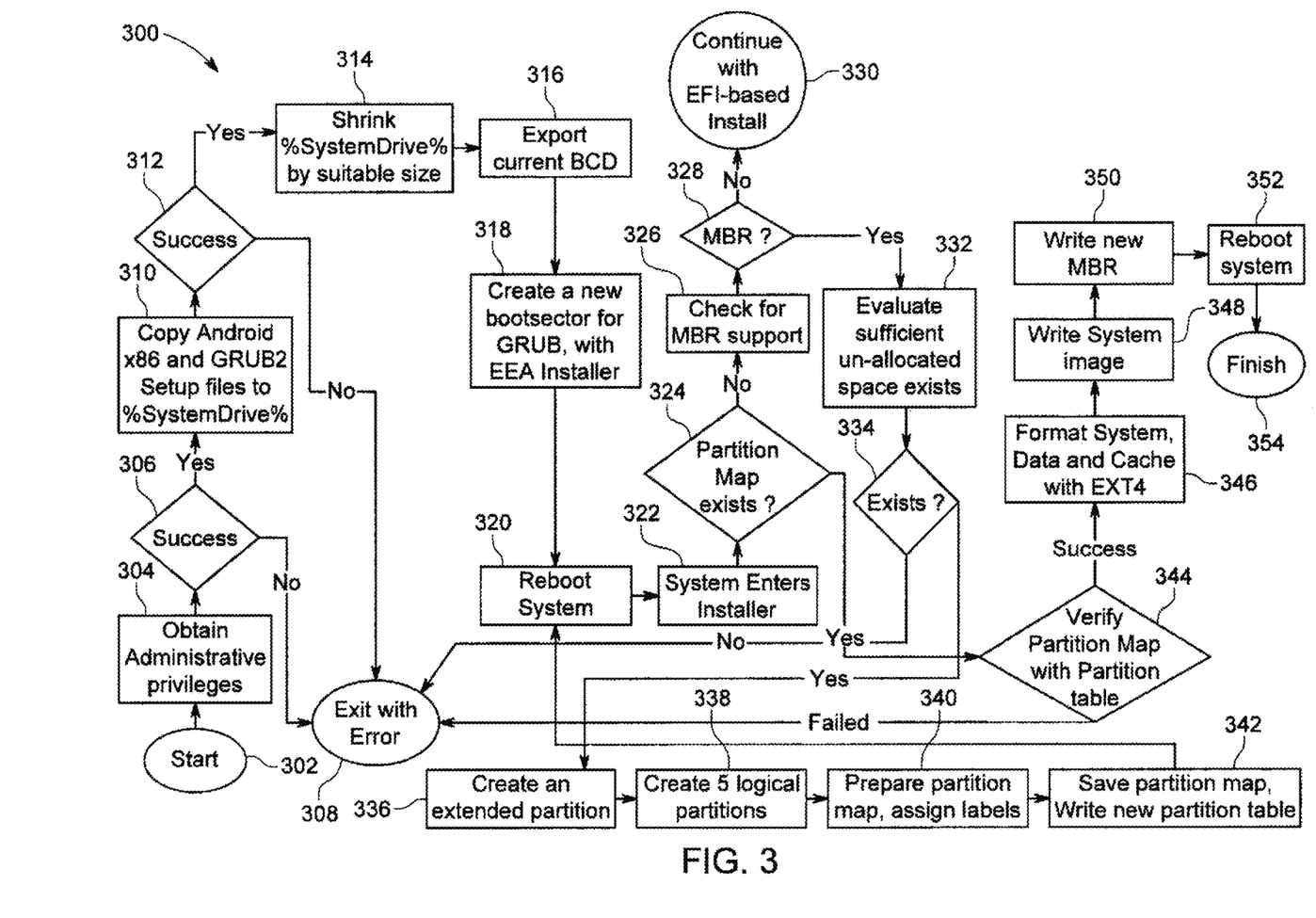
FIG. 3 is an embodiment of a second process for automated migration of an operating system on a computing device in accordance with the present disclosure.

Next, the GRUB bootloader loads and launches a custom Android OS installer, which detects that the installation is a migration from Windows. In such a case, the process may intelligently detect the unallocated space which was created during the shrinking of the Windows partition, and carefully carve out Android partitions within that space and perform the OS installation seamlessly. After successful installation of the Android OS, the installer may remove Windows Boot Manager and replaces it with our customized GRUB which will auto-detect the dual OS configuration allowing users to boot into Android as well Windows by choice FIG. 3 is an embodiment of another process 300 for automated migration of an operating system on a computing device in accordance with the present disclosure. In this embodiment, the process 300 starts at 302, and obtains administrative privileges at 304. A determination is made whether the process 300 has successfully obtained administrative privileges at 306. If not, the process 300 exits with an error indication at 308.

If it is determined that administrative privileges have been successfully obtained (at 306), the process 300 proceeds to copying Android x86 and GRUB2 setup files to a storage location (e.g. % SystemDrive %) at 310. At 312, a determination is made whether the process 300 has successfully performed the copying operations at 310. If not, the process 300 exits with an error indication at 308.

If copying operations were successful (at 312), then the process 300 includes shrinking an original operating system (e.g. Windows) storage requirement by a suitable size at 314. In at least some embodiments, the shrinking operations (at 314) may be performed at least partially using an existing utility of the operating system (e.g. Windows Diskpart, Linux Gparted, etc.).

As further shown in FIG. 3, in some embodiments the process 300 includes exporting current boot configuration data (BCD) to a safe place as a backup in case things go wrong at 316. Next, the process 300 creates a new bootsector for GRUB (such as with an installer of a suitable operating system) at 318 (e.g. with a firmware installer, etc.). The process 300 further includes rebooting the system at 320, and the system enters an installer at 322. In at least some embodiments, the installer (at 318, 322) is an Android OS installer of a customized Android-based operating system created to run on x86 machines, such as the Esper Foundation Installer developed by Esper.io of Bellevue, Washington.

A determination is made at 324 whether a partition map exists. If not, the process 300 checks for Master Boot Record (MBR) support at 326, and determines whether MBR exists at 328. If it is determined that MBR does not exist (at 328), the process 300 continues with an EFI-based (Extensible Firmware Interface) installation at 330.

If it is determined that MBR does exist (at 328), then the process 300 evaluates whether sufficient un-allocated space exists at 332. At 334, a determination is made whether the un-allocated space is sufficient. If not, the process 300 exits with an error indication at 308.

If sufficient un-allocated space exists (at 334), then the process 300 includes creating an extended partition at 336, creating five logical partitions at 338, preparing a partition map and assigning labels at 340, and saving the partition map and writing a new partition table at 342.

As further shown in FIG. 3, in at least some embodiments, the process 300 returns to rebooting the system at 320, entering the installer at 322, and again determining whether a partition map exists at 324. Now that the partition map exists (at 324), the process 300 verifies the partition map with the partition table at 344. If the verification (at 344) is unsuccessful, the process 300 exits with an error indication at 308.

If the verification (at 344) is successful, then the process 300 includes formatting the system, data, and cache with a suitable Linux system (e.g. EXT4 filesystem) at 346. Next, the process 300 writes the system image at 348, and writes the new Master Boot Record (MBR) at 350. The process 300 then reboots the system at 352, and finishes (or continues to other operations) at 354.

Systems and methods in accordance with the present disclosure may provide substantial advantages over the prior art. For example, such systems and methods may advantageously provide an automated method to allow installation of custom Android OS on x86 machines running Microsoft Windows, while preserving an existing Windows OS installation, and creating dual boot configuration without any data loss. In addition, in some embodiments, techniques and technologies in accordance with the present disclosure may shrink the Windows partition, where the Android installation may happen, and once the shrink is successful, the Android OS files may be prepared for installation. The Android OS files may contain a package for boot loader for Windows, which will be used to transfer control to installer during system reboots process. In some embodiments, a system may add a new boot configuration data (BCD) entry to load the boot loader for Windows on the next boot, and reboot the machine. In addition, a boot loader may load and launch a custom Android OS installer, which may identify the installation is a migration from Windows. In some embodiments, a custom Android OS installer may detect the unallocated space, which was created during the shrink of the Windows partition and forms an Android partition within that space to perform the OS installation seamlessly. After successful installation of the Android OS, in some embodiments, the installer removes Windows Boot Manager and replaces it with customized boot loader, which will auto-detect the dual OS configuration allowing users to boot into Android as well Windows by choice.

Figure 4:
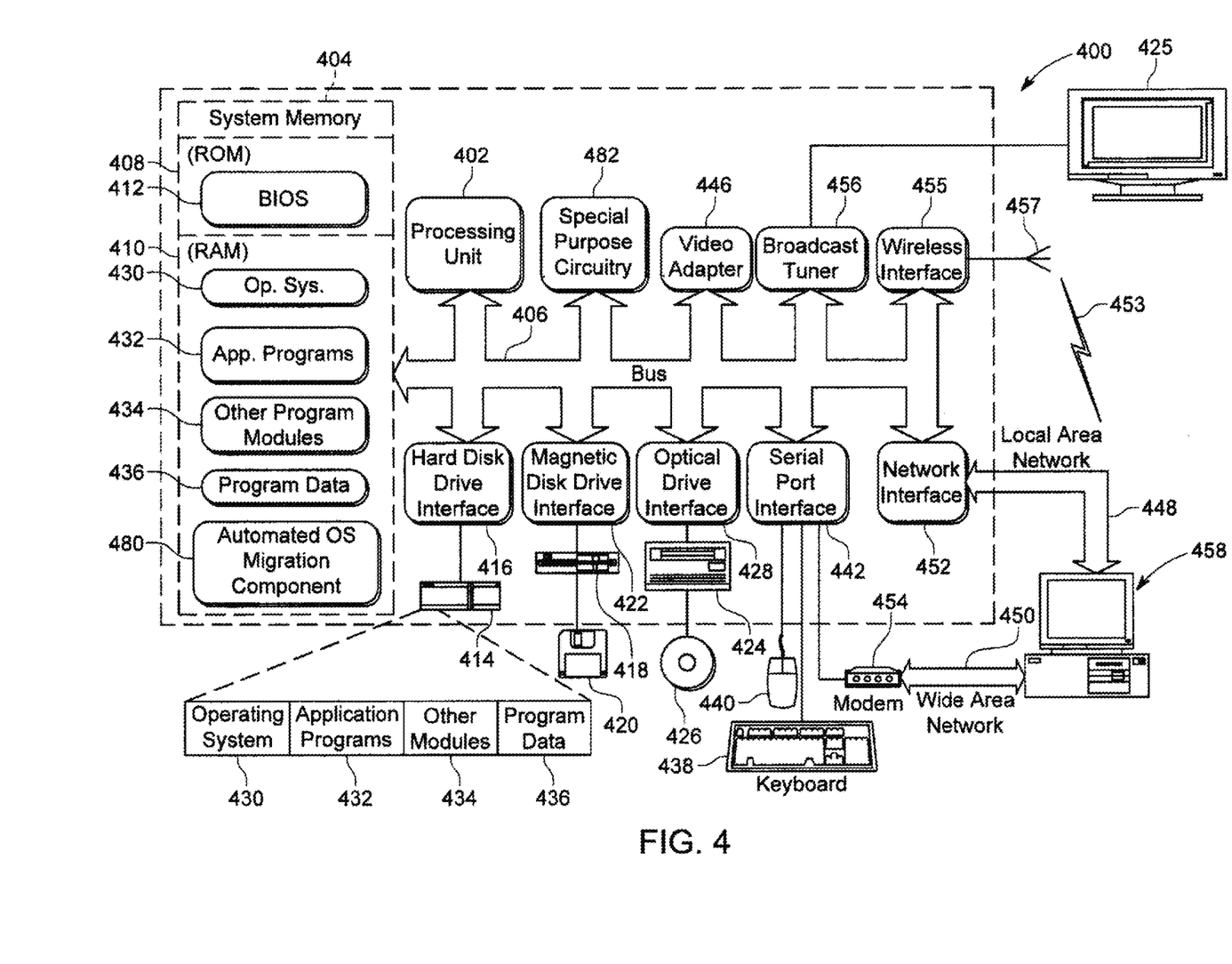
FIG. 4 is a schematic view of an exemplary computing device configured to operate in accordance with the present disclosure.

FIG. 4 is a schematic view of an exemplary system 400 in accordance with another possible embodiment. In some embodiments, the system 400 may include one or more processors (or processing units) 402, special purpose circuitry 482, a memory 404, and a bus 406 that couples various system components, including the memory 404, to the one or more processors 402 and special purpose circuitry 482 (e.g. ASIC, FPGA, etc.). The bus 406 represents one or more of any of several types of bus structures, including a memory bus or memory controller, a peripheral bus, an accelerated graphics port, and a processor or local bus using any of a variety of bus architectures. In this implementation, the memory 404 includes read only memory (ROM) 408 and random access memory (RAM) 410. A basic input/output system (BIOS) 412, containing the basic routines that help to transfer information between elements within the system 400, such as during start-up, is stored in ROM 408.

The exemplary system 400 further includes a hard disk drive 414 for reading from and writing to a hard disk (not shown), and is connected to the bus 406 via a hard disk driver interface 416 (e.g., a SCSI, ATA, or other type of interface). A magnetic disk drive 418 for reading from and writing to a removable magnetic disk 420, is connected to the system bus 406 via a magnetic disk drive interface 422. Similarly, an optical disk drive 424 for reading from or writing to a removable optical disk 426 such as a CD ROM, DVD, or other optical media, connected to the bus 406 via an optical drive interface 428. The drives and their associated computer-readable media provide nonvolatile storage of computer readable instructions, data structures, program modules and other data for the system 400. Although the exemplary system 400 described herein employs a hard disk, a removable magnetic disk 420 and a removable optical disk 426, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 4, a number of program modules may be stored on the memory 404 (e.g. the ROM 408 or the RAM 410) including an operating system 430, one or more application programs 432, other program modules 434, and program data 436 (e.g. the data store 420, image data, audio data, three dimensional object models, etc.). Alternately, these program modules may be stored on other computer-readable media, including the hard disk, the magnetic disk 420, or the optical disk 426. For purposes of illustration, programs and other executable program components, such as the operating system 430, are illustrated in FIG. 4 as discrete blocks, although it is recognized that such programs and components reside at various times in different storage components of the system 400, and may be executed by the processor(s) 402 or the special purpose circuitry 482 of the system 400.

A user may enter commands and information into the system 400 through input devices such as a keyboard 438 and a pointing device 440. Other input devices (not shown) may include a microphone, joystick, game pad, satellite dish, scanner, or the like. These and other input devices are connected to the processing unit 402 and special purpose circuitry 482 through an interface 442 that is coupled to the system bus 406. A monitor 425 may be connected to the bus 406 via an interface, such as a video adapter 446. In addition, the system 400 may also include other peripheral output devices (not shown) such as speakers and printers.

The system 400 may operate in a networked environment using logical connections to one or more remote computers (or servers) 458. Such remote computers (or servers) 458 may be a personal computer, a server, a router, a network PC, a peer device or other common network node, and may include many or all of the elements described above relative to system 400. The logical connections depicted in FIG. 4 may include one or more of a local area network (LAN) 448 and a wide area network (WAN) 450. Such networking environments are commonplace in offices, enterprise-wide computer networks, intranets, and the Internet. In this embodiment, the system 400 also includes one or more broadcast tuners 456. The broadcast tuner 456 may receive broadcast signals directly (e.g., analog or digital cable transmissions fed directly into the tuner 456) or via a reception device (e.g., via sensor 150, sensor 250, an antenna, a satellite dish, etc.).

When used in a LAN networking environment, the system 400 may be connected to the local network 448 through a network interface (or adapter) 452. When used in a WAN networking environment, the system 400 typically includes a modem 454 or other means for establishing communications over the wide area network 450, such as the Internet. The modem 454, which may be internal or external, may be connected to the bus 406 via the serial port interface 442. Similarly, the system 400 may exchange (send or receive) wireless signals 453 (e.g. selection signals 144, signals 244, core portion 102, core portion 202, etc.) with one or more remote devices (e.g. remote 142, remote 242, computers 258, etc.), using a wireless interface 455 coupled to a wireless communicator 457 (e.g., sensor 150, sensor 250, an antenna, a satellite dish, a transmitter, a receiver, a transceiver, a photoreceptor, a photodiode, an emitter, a receptor, etc.).

In a networked environment, program modules depicted relative to the system 400, or portions thereof, may be stored in the memory 404, or in a remote memory storage device. More specifically, as further shown in FIG. 4, an automated operating system migration component 480 may be stored in the memory 404 of the system 400. The automated operating system migration component 480 may be implemented using software, hardware, firmware, or any suitable combination thereof. In cooperation with the other components of the system 400, such as the processing unit 402 or the special purpose circuitry 482, the automated operating system migration component 480 may be operable to perform one or more implementations of processes for automated operating system migration in accordance with the present disclosure.

Accordingly, in some embodiments, a system in accordance with the present disclosure comprises: at least one processor; a storage operatively coupled to the at least one processor, the storage storing a first operating system, and further storing processor-readable instructions configured to perform operations including at least: reducing a size of the first operating system to require less space on a first storage portion storing the first operating system; repartitioning the storage to form a second storage portion sized to receive a second operating system; installing a bootloader operable to load either the first operating system or the second operating system; installing the second operating system into the second storage portion; rebooting the system using the bootloader; receiving an input indicative of a selection of either the first operating system or the second operating system; and booting one of the first operating system or the second operating system in accordance with the input.

In some embodiments, the first operating system is a Windows operating system, and the second operating system is an Android operating system; and wherein the at least one processor includes an x86 processor. And in some embodiments, the storage stores processor-readable instructions configured to perform operations further comprising: presenting a query via a display whether to load either the first operating system or the second operating system.

In addition, in some embodiments, installing a bootloader operable to load either the first operating system or the second operating system comprises removing a first bootloader associated with the first operating system that is not operable to load the second operating system, and installing the bootloader operable to load either the first operating system or the second operating system. And in some embodiments, installing a bootloader operable to load either the first operating system or the second operating system comprises installing a GRUB (GRand Unified Bootloader) bootloader operable to load either the first operating system or the second operating system. In some embodiments, installing the second operating system into the second storage portion comprises installing the second operating system into the second storage portion while preserving the existing installation of the first operating system.

Moreover, in some embodiments, the storage stores processor-readable instructions configured to perform operations further comprising: exporting current boot configuration data to a storage location as a backup. And in some embodiments, the storage stores processor-readable instructions configured to perform operations further comprising: removing a first bootloader associated with the first operating system that is not operable to load the second operating system.

In addition, in some embodiments, a system in accordance with the present disclosure comprises: at least one processor; a storage operatively coupled to the at least one processor, the storage storing a first operating system on a first storage portion, and further storing processor-readable instructions configured to perform operations including at least: determining that an un-allocated portion of the storage is sufficient to receive a second operating system; repartitioning the storage to form a second storage portion sized to receive the second operating system; installing a bootloader operable to load either the first operating system or the second operating system; installing the second operating system into the second storage portion; rebooting the system using the bootloader; receiving an input indicative of a selection of either the first operating system or the second operating system; and booting one of the first operating system or the second operating system in accordance with the input.

In addition, in some embodiments, the storage stores processor-readable instructions configured to perform operations further comprising: replacing the first operating system with the second operating system. In some embodiments, determining that an un-allocated portion of the storage is sufficient to receive a second operating system comprises shrinking the first storage portion storing the first operating system until the un-allocated portion of the storage is sufficient to receive the second operating system.

In further embodiments, installing the second operating system into the second storage portion comprises installing the second operating system into the second storage portion while preserving the existing installation of the first operating system. And in some embodiments, the storage stores processor-readable instructions configured to perform operations further comprising: exporting current boot configuration data to a storage location as a backup.

In still further embodiments, a system in accordance with the present disclosure comprises: at least one processor; a storage operatively coupled to the at least one processor, the storage storing a first operating system, and further storing processor-readable instructions configured to perform operations including at least: obtaining one or more administrative privileges; copying setup files to a storage location; shrinking a first operating system storage requirement to provide space for a second operating system; exporting current boot configuration data to a backup storage location; determining that an un-allocated portion of the storage is sufficient to receive a second operating system; repartitioning the storage to form a second storage portion sized to receive the second operating system; installing a bootloader operable to load either the first operating system or the second operating system; installing the second operating system into the second storage portion while preserving the existing installation of the first operating system; and rebooting the system using the bootloader operable to load either the first operating system or the second operating system.

In some embodiments, determining that an un-allocated portion of the storage is sufficient to receive a second operating system comprises determining whether at least one of a partition map exists or a Master Boot Record support exists to at least partially perform the determination. And in some embodiments, determining that an un-allocated portion of the storage is sufficient to receive a second operating system comprises employing an Extensible Firmware Interface installation to at least partially perform the determination.

In addition, in some embodiments, installing a bootloader operable to load either the first operating system or the second operating system comprises writing a new Master Boot Record. And in some embodiments, the storage stores processor-readable instructions configured to perform operations further comprising: receiving an input indicative of a selection of either the first operating system or the second operating system; and booting one of the first operating system or the second operating system in accordance with the input. In some embodiments, the first operating system is a Windows operating system, and the second operating system is an Android operating system. And in further embodiments, the installing a bootloader operable to load either the first operating system or the second operating system comprises creating a new bootsector for a GRUB (GRand Unified Bootloader) bootloader.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

In addition, although various specific embodiments have been described above, it should be understood that they have been presented by way of example only, and not limitation. The descriptions are not intended to limit the scope of the technology to the particular forms set forth herein. To the contrary, the present descriptions are intended to cover such alternatives, modifications, and equivalents as may be included within the spirit and scope of the technology as defined by the appended claims and otherwise appreciated by one of ordinary skill in the art. The various embodiments of the present disclosure may be embodied in other specific forms without departing from the spirit or essential attributes thereof, and it is therefore desired that the various embodiments in the present disclosure be considered in all respects as illustrative and not restrictive. Thus, the breadth and scope of a preferred embodiment should not be limited by any of the above-described exemplary embodiments.

What is claimed is:

1. A system, comprising:
   at least one processor;
   a storage operatively coupled to the at least one processor, the storage storing a first operating system that includes one or more first core operating system components that are ready to be booted, and further storing processor-readable instructions configured to perform operations including at least:
      reducing a size of the first operating system to require less space on a first storage portion storing the first operating system while maintaining the readiness of the one or more first core operating system components of the first operating system to be booted;
      repartitioning the storage to form a second storage portion sized to receive a second operating system, the second operating system including one or more second core operating system components, wherein repartitioning the storage to form the second storage portion includes at least:
         determining whether a partition map exists to determine whether sufficient un-allocated space exists to install the second operating system;
         if a partition map does not exist, determining whether a Master Boot Record exists to determine whether sufficient un-allocated space exists to install the second operating system; and
         if both the partition map and the Master Boot Record do not exist, then employing an Extensible Firmware Interface installation to determine whether sufficient un-allocated space exists to install the second operating system;
      installing a bootloader operable to load either the first operating system or the second operating system;
      installing the second operating system into the second storage portion such that the one or more second core operating system components of the second operating system are ready to be booted;
      rebooting the system using the bootloader;
      receiving an input indicative of a selection of either the first operating system or the second operating system; and
      booting one of the first operating system or the second operating system in accordance with the input.

2. The system of claim 1, wherein the first operating system is a Windows operating system, and the second operating system is an Android operating system; and wherein the at least one processor includes an x86 processor.

3. The system of claim 1, wherein the storage stores processor-readable instructions configured to perform operations further comprising:
   presenting a query via a display whether to load either the first operating system or the second operating system.

4. The system of claim 1, wherein installing a bootloader operable to load either the first operating system or the second operating system comprises removing a first bootloader associated with the first operating system that is not operable to load the second operating system, and installing the bootloader operable to load either the first operating system or the second operating system.

5. The system of claim 1, wherein installing a bootloader operable to load either the first operating system or the second operating system comprises installing a GRUB (GRand Unified Bootloader) bootloader operable to load either the first operating system or the second operating system.

6. The system of claim 1, wherein installing the second operating system into the second storage portion such that the one or more second core operating system components of the second operating system are ready to be booted comprises installing the second operating system into the second storage portion such that the one or more first core operating system components of the first operating system remain ready to be booted.

7. The system of claim 1, wherein the storage stores processor-readable instructions configured to perform operations further comprising:
   exporting current boot configuration data to a storage location as a backup.

8. The system of claim 1, wherein the storage stores processor-readable instructions configured to perform operations further comprising:
   removing a first bootloader associated with the first operating system that is not operable to load the second operating system.

9. A system, comprising:
   at least one processor;
   a storage operatively coupled to the at least one processor, the storage storing a first operating system that includes one or more first core operating system components that are ready to be booted on a first storage portion, and further storing processor-readable instructions configured to perform operations including at least:
reducing a size of the first operating system to require less space such that a size of the first storage portion is reduced while maintaining the readiness of the one or more first core operating system components of the first operating system to be booted to create an un-allocated portion of the storage;
determining that the un-allocated portion of the storage is sufficient to receive a second operating system, the second operating system including one or more second core operating system components;
repartitioning the storage to form a second storage portion sized to receive the second operating system, wherein repartitioning the storage to form the second storage portion includes at least:
determining whether a partition map exists to determine whether sufficient un-allocated space exists to install the second operating system;
if a partition map does not exist, determining whether a Master Boot Record exists to determine whether sufficient un-allocated space exists to install the second operating system; and
if both the partition map and the Master Boot Record do not exist, then employing an Extensible Firmware Interface installation to determine whether sufficient un-allocated space exists to install the second operating system;
installing a bootloader operable to load either the first operating system or the second operating system;
installing the second operating system into the second storage portion such that the one or more second core operating system components of the second operating system are ready to be booted;
rebooting the system using the bootloader;
receiving an input indicative of a selection of either the first operating system or the second operating system; and
booting one of the first operating system or the second operating system in accordance with the input.

10. The system of claim 9, wherein reducing a size of the first operating system to require less space such that a size of the first storage portion is reduced while maintaining the readiness of the one or more first core operating system components of the first operating system to be booted to create an un-allocated portion of the storage comprises:
reducing a size of the first operating system until the un-allocated portion of the storage is sufficient to receive the second operating system.

11. The system of claim 9, wherein determining that an un-allocated portion of the storage is sufficient to receive a second operating system comprises shrinking the first storage portion storing the first operating system until the un-allocated portion of the storage is sufficient to receive the second operating system.

12. The system of claim 9, wherein installing the second operating system into the second storage portion comprises installing the second operating system into the second storage portion while preserving the existing installation of the first operating system.

13. The system of claim 9, wherein the storage stores processor-readable instructions configured to perform operations further comprising:
exporting current boot configuration data to a storage location as a backup.

14. A system, comprising:
at least one processor;
a storage operatively coupled to the at least one processor, the storage storing a first operating system that includes one or more first core operating system components that are ready to be booted, and further storing processor-readable instructions configured to perform operations including at least:
obtaining one or more administrative privileges;
copying setup files to a storage location;
shrinking a first operating system storage requirement while maintaining the readiness of the one or more first core operating system components of the first operating system to be booted to create an un-allocated portion of the storage to provide space for a second operating system;
exporting current boot configuration data to a backup storage location;
determining that the un-allocated portion of the storage is sufficient to receive a second operating system, the second operating system including one or more second core operating system components;
repartitioning the storage to form a second storage portion sized to receive the second operating system, wherein repartitioning the storage to form the second storage portion includes at least:
determining whether a partition map exists to determine whether sufficient un-allocated space exists to install the second operating system;
if a partition map does not exist, determining whether a Master Boot Record exists to determine whether sufficient un-allocated space exists to install the second operating system; and
if both the partition map and the Master Boot Record do not exist, then employing an Extensible Firmware Interface installation to determine whether sufficient un-allocated space exists to install the second operating system;
installing a bootloader operable to load either the first operating system or the second operating system;
installing the second operating system into the second storage portion such that the one or more second core operating system components of the second operating system are ready to be booted while maintaining the readiness of the one or more first core operating system components of the first operating system to be booted; and
rebooting the system using the bootloader operable to load either the first operating system or the second operating system.

15. The system of claim 14, wherein determining that the un-allocated portion of the storage is sufficient to receive a second operating system comprises determining whether at least one of a partition map exists or a Master Boot Record support exists to at least partially perform the determination.

16. The system of claim 14, wherein determining that the un-allocated portion of the storage is sufficient to receive a second operating system comprises employing an Extensible Firmware Interface installation to at least partially perform the determination.

17. The system of claim 14, wherein shrinking a first operating system storage requirement while maintaining the readiness of the one or more first core operating system components of the first operating system to be booted to create an un-allocated portion of the storage to provide space for a second operating system comprises:
shrinking a size of the first operating system until the un-allocated portion of the storage is sufficient to receive the second operating system.

18. The system of claim 14, wherein the storage stores processor-readable instructions configured to perform operations further comprising:
- receiving an input indicative of a selection of either the first operating system or the second operating system; and
- booting one of the first operating system or the second operating system in accordance with the input.

19. The system of claim 9, wherein after determining that sufficient un-allocated space exists to install the second operating system, then performing operations further includes: creating an extended partition, preparing a partition map, and writing a partition table.

20. The system of claim 1, wherein after determining that sufficient un-allocated space exists to install the second operating system, then performing operations further includes: creating an extended partition, preparing a partition map, and writing a partition table.

\* \* \* \* \*